United States Patent [19]

Sindelar

[11] 4,377,385
[45] Mar. 22, 1983

[54] HOMOKINETIC UNIVERSAL JOINT

[76] Inventor: William F. Sindelar, 8009 York Rd., Towson, Md. 21204

[21] Appl. No.: 223,282

[22] Filed: Jan. 8, 1981

[51] Int. Cl.³ .............................................. F16D 3/22
[52] U.S. Cl. .................... 464/142; 464/906
[58] Field of Search ............... 464/141, 906, 139, 142, 464/143, 111

[56] References Cited

U.S. PATENT DOCUMENTS

| | | | |
|---|---|---|---|
| 1,522,351 | 1/1925 | Weiss | 464/906 X |
| 1,524,161 | 1/1925 | Weiss | 464/906 X |
| 1,832,794 | 11/1931 | Shepard | 464/141 |
| 2,046,584 | 7/1936 | Rzeppa | 464/906 X |
| 2,286,182 | 6/1942 | Amberg | 464/141 |
| 2,286,498 | 6/1942 | Miller, Jr. | 464/142 |
| 2,653,456 | 9/1953 | Heym | 464/141 |
| 3,071,943 | 1/1963 | Kings | 464/142 |
| 3,187,635 | 6/1965 | Koss | 464/141 |
| 3,478,538 | 11/1969 | Heimler | 464/141 |
| 3,802,221 | 4/1974 | Kimata | 464/141 |
| 4,091,641 | 5/1978 | Welschof | 464/905 X |

*Primary Examiner*—Stuart S. Levy
*Assistant Examiner*—Daniel P. Stodola

[57] ABSTRACT

A universal joint has two shafts, axially restrained, but pivotable from a common point. One shaft end is in the form of a thick-walled hollow sphere. Two axially extending grooves are cut into the wall facing each other in a circumferentially opposed relationship to form a first set. The other shaft end is in the form of a spherical bowl having a central ball. The inside surface of the bowl and the surface of the ball define an annular spherical cavity into which the hollow sphere nests. Two axially extending grooves are cut, one in each surface, in a radially opposed relationship to form a second set. Each set of grooves positively determines the line path that the center of an enclosed ball will travel. In the assembled joint, the line paths are in mirror image relationship and always intersect in the homokinetic plane. The ball, being enclosed by each set is forced to occupy the intersection. The number of balls used can be any number, odd or even.

11 Claims, 21 Drawing Figures

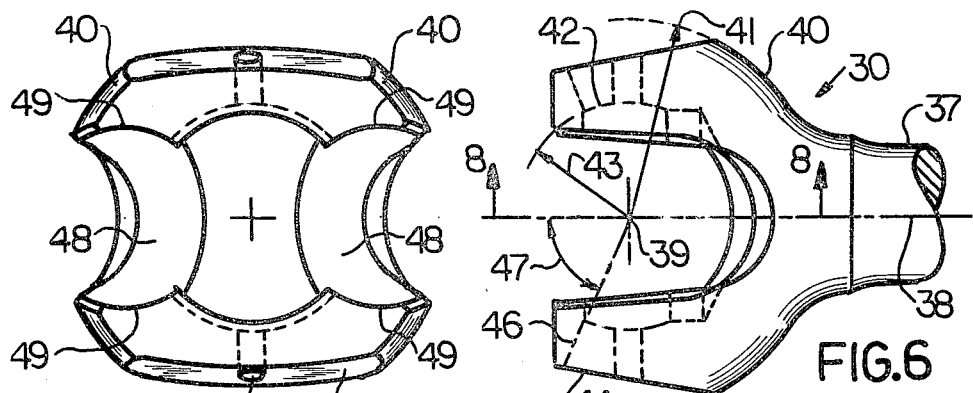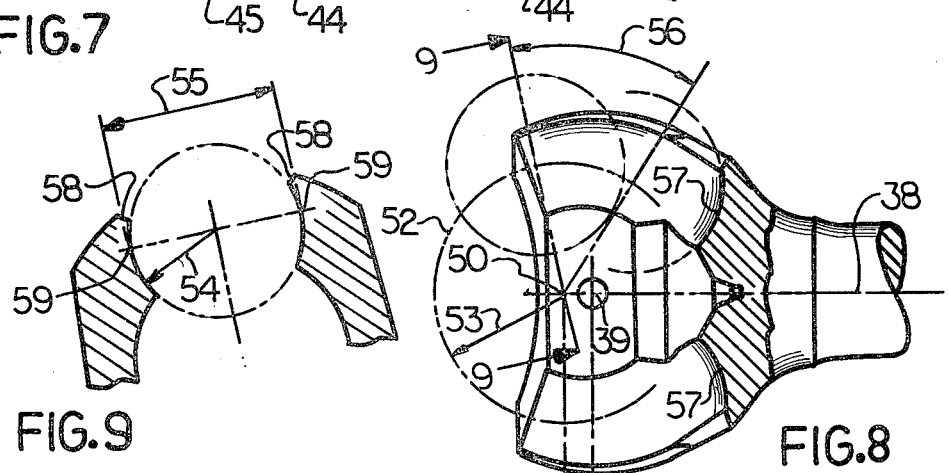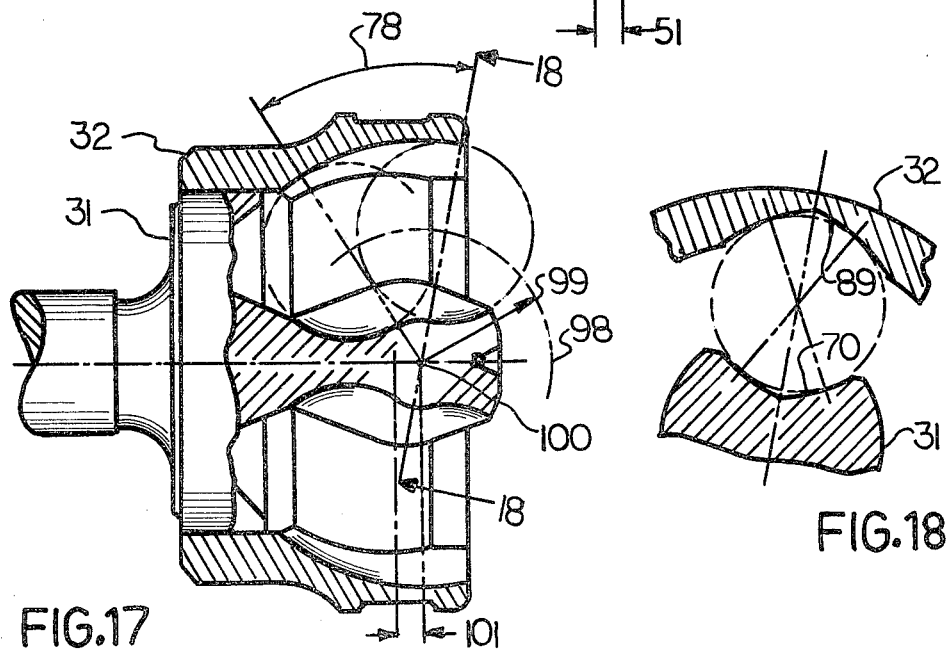

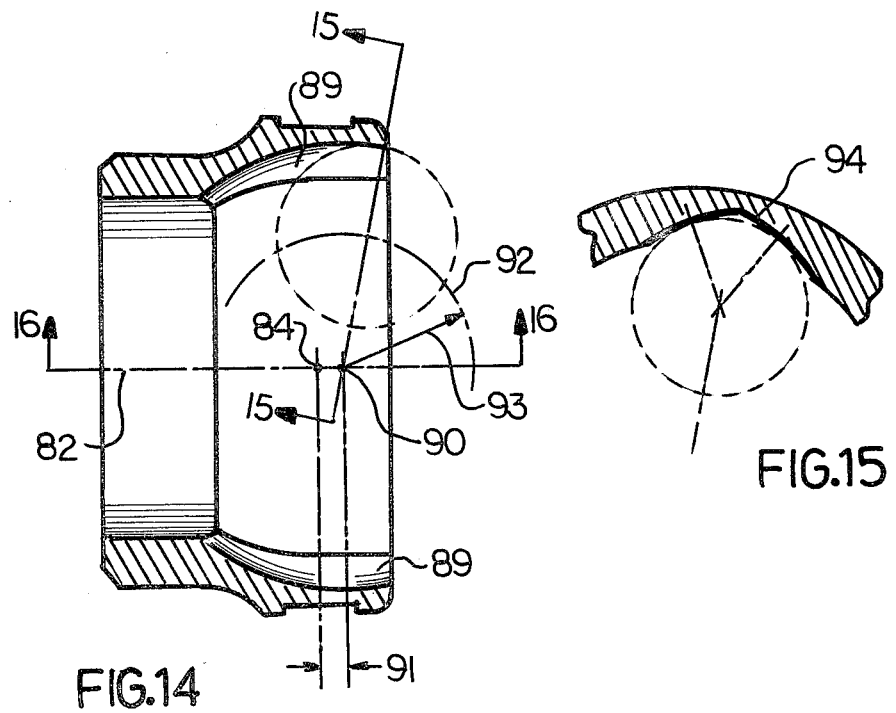
FIG.14
FIG.15
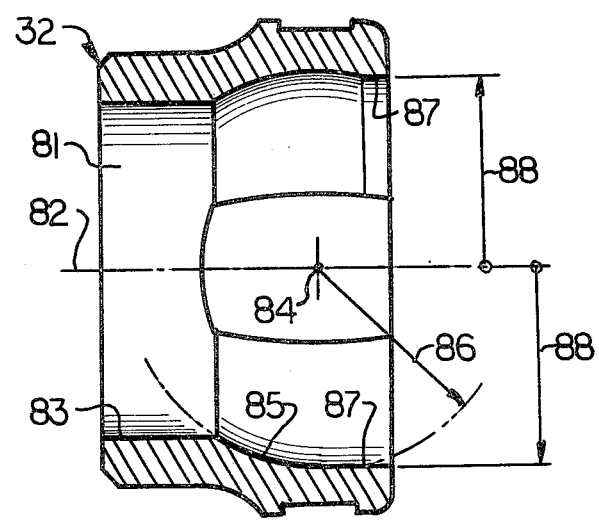
FIG.16

HOMOKINETIC UNIVERSAL JOINT

TECHNICAL FIELD

This invention is in the general field of homokinetic universal joints as classified in U.S. Patent Class 64-21. Specifically, it pertains to those universal joints that are axially restrained and where torque is transmitted by balls steered into the homokinetic plane by crossed grooves.

BACKGROUND ART

The crossed groove principle is old. It is also known as the track steering principle. Prior to this invention, this principle has been applied in the following way:

A ball-guiding groove is made in one half of the universal joint. Another groove is made in the other half. Each groove is considered to have an imaginary line path that is generated by the center of a ball as it moves along the groove. In the assembled condition of the joint halves, the grooves are in such an opposed relationship that their imaginary line paths always intersect at a point, no matter what angularity the joint halves assume to each other. This point of intersection always lies in the homokinetic plane. A ball confined between the grooves tends to occupy the point of intersection. Whether it does so in the positive, predictable manner that is a critical requirement for proper operation of the joint, depends upon the way the grooves are opposed to each other.

If the grooves are opposed in a radial direction, i.e. one on top of the other, the ball must be urged to the line path intersection by additional means, such as a cage. The ball can transmit torque from one joint half to the other in either direction of rotation. Four balls is the minimum that can be used for proper control. In practice, six are used. The foregoing is best exemplified by U.S. Pat. No. 2,046,584 issued to Rzeppa.

If the grooves are opposed in a peripheral direction, i.e. facing each other side by side, the ball is steered positively into the line path intersection without additional means. The ball, however, can transmit torque from one joint half to the other in only one rotational direction. Four balls is the minimum that can be used. In practice, four are used. The foregoing is best exemplified by U.S. Pat. No. 1,522,531 issued to Weiss.

Numerous other designs shown in the Prior Art use the principle in the same manner. It could more precisely be labeled the Crossed Dependent Groove principle, because one groove in one half of the joint cannot, by itself constrain the ball to travel along the line path associated with that half of the joint. It depends upon the cooperation of an opposed groove in the other half of the joint for ball control, and vice versa.

In contrast, this invention introduces the concept of Crossed Independent Grooves. In each joint half, the grooves are so arranged that they constrain the enclosed ball to travel along the line path associated with that half of the joint independently from the grooves constraining the same ball in the other joint half. This results in positive confinement of the torque transmitting ball to the homokinetic plane by grooves alone, with the ball being able to transmit torque in either rotational direction.

DISCLOSURE OF INVENTION

The invention resides in the novel construction and assembly of a homokinetic universal joint utilizing a new method of ball control.

The two joint halves are axially restrained to pivot at a common point by a double nested ball and socket joint. The torque transmitting connection between the halves is by means of balls. Each ball is completely controlled and guided by a set of circumferentially opposed grooves in one half of the joint, and simultaneously completely guided and controlled by a set of radially opposed grooves in the other half of the joint.

The resulting interaction of the two groove sets on the enclosed ball positively keeps it in the homokinetic plane.

The invention meets these objectives:
1. Reduced cost and weight.
2. Few parts.
3. High torque capacity to diametral size ratio.
4. Good lubricant distribution.
5. Uncomplicated assembly resulting in a complete unitary driveshaft assembly.

BRIEF DESCRIPTION OF THE DRAWINGS

FIG. 6 shows a top view of the driveshaft.

FIG. 7 shows an end view of the driveshaft.

FIG. 8 is a sectional view taken in the direction of arrows 8—8 shown in FIG. 6.

FIG. 9 is a sectional view taken in the direction of arrows 9—9 shown in FIG. 8.

FIG. 14 is a sectional view of the cap taken in a diametral plane through the ball grooves.

FIG. 15 is a sectional view of the cap taken in the direction of arrows 15—15 shown in FIG. 14.

FIG. 16 is a sectional view of the cap taken in the direction of arrows 16—16 shown in FIG. 14.

FIG. 17 is a sectional view of the wheel spindle and the cap in assembled position with grooves aligned.

FIG. 18 is a sectional view taken in the direction of arrows 18—18 shown in FIG. 17.

BEST MODE FOR CARRYING OUT THE INVENTION

1. Description of the Structure.

Figure 1:
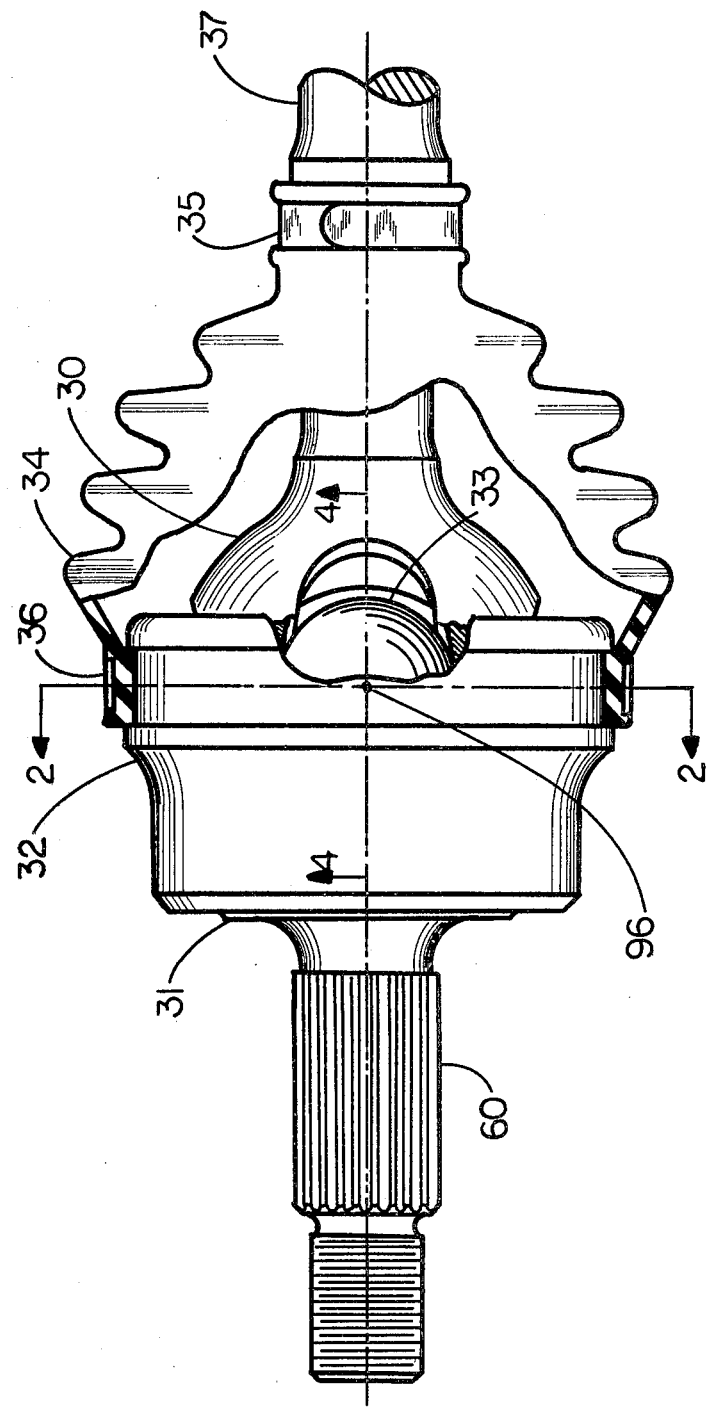
FIG. 1 shows a general view of the universal joint with cap and boot partially cut away.

FIG. 1 shows a preferred embodiment of the invention in a typical automotive front wheel drive application.

It consists of:
(a) Driveshaft 30.
(b) Wheel Spindle 31.
(c) Cap 32.
(d) Balls 33.
(e) Boot 34.
(f) Driveshaft Clamp 35.
(g) Cap Clamp 36.

The driveshaft 30 is referred to in the claims and some parts of this description as the *First Joint Half*. The wheel spindle 31 and cap 32 form an integral part after assembly of the joint as will be described, and this integral part is referred to in the claims and some parts of this description as the *Second Joint Half*.

The boot and clamps are shown for completeness and are not part of this invention. The physical structure of the remaining parts is described below.

Driveshaft 30:

Refer to FIG. 6 and FIG. 7 which show a top and end view of driveshaft 30. The shaft portion 37 has at its other end (not shown) means, such as a spline, for connection to a power source. The shaft has an axis of rotation 38. Using a point 39 on the axis of rotation as a center, a partial convex spherical surface 40 having a radius 41 is constructed. About the same center 39, a partial concave spherical surface 42 having a radius 43 is constructed, resulting in an annular spherical wall section. The convex spherical surface is cut away at two places 44 for weight reduction and lubricant access holes 45 are drilled to communicate with the concave spherical surface 42.

Again using center point 39, a conical end surface 46 with an apex angle 47 is constructed to define a stop surface.

Two slots 48, diametrically opposite, are cut into the annular spherical wall. Each slot defines a set of circumferentially opposed grooves 49. The grooves are constructed as follows:

Refer to FIG. 8. On the axis of rotation 38, a point 50 is located to the left of point 39 at a distance 51. Using this point as a center, a circle 52 of radius 53 establishes a theoretical line path. A contoured cutter cuts grooves 49, such that the center of ball 33 rolling in contact with the grooves will follow the path. Referring to FIG. 9, the curvature 54 of each groove 49 closely conforms to that of ball 33. The grooves are spaced apart a distance 55 equal to the diameter of ball 33 plus a very small clearance. The grooves are cut in an axial direction to the extent shown by angle 56 in FIG. 8, the end surfaces 57 forming stop surfaces. The feather edges left by the intersection of the grooves and spherical surface 40 are removed by chamfers 58.

Thus a ball 33, when inserted into either set of circumferentially opposed grooves 49, is positively confined to the traveling of a curved path for a limited angular distance. In so doing, as can best be seen in FIG. 8, the center of the ball describes a ball center line path of a specific geometrical shape, i.e. circle 52. The points of contact between ball and groove when the joint is under torque loading are at points 59.

Figure 11:
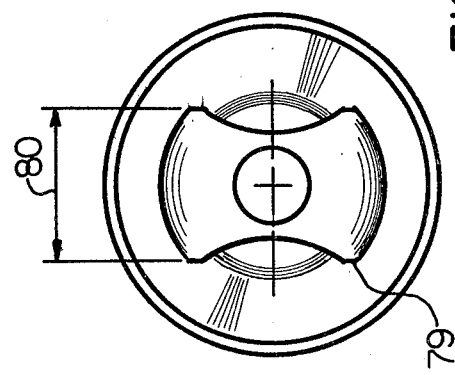
FIG. 11 shows an end view of the wheel spindle.
Figure 10:
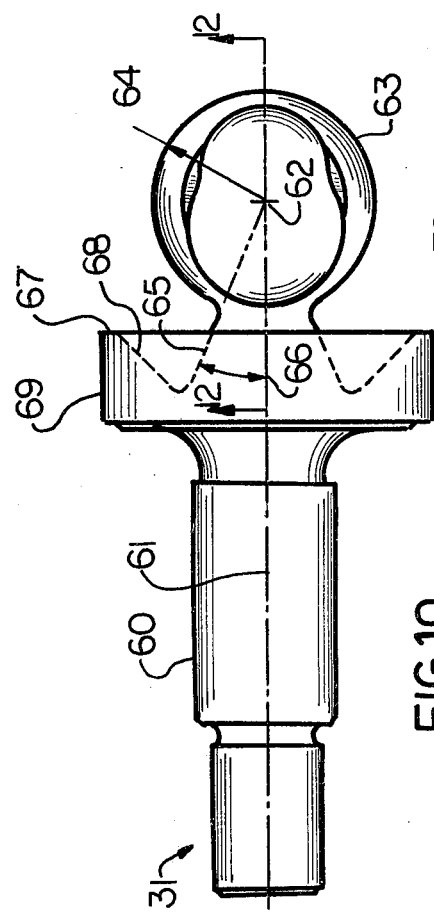
FIG. 10 shows a top view of the wheel spindle.

Wheel Spindle 31:

Refer to FIG. 10 and FIG. 11 which show a top view and an end view of the wheel spindle 31. The shaft portion 60 is adapted for connection to a wheel. The shaft has an axis of rotation 61. Using a point 62 on the axis of rotation as a center, a partial convex spherical surface 63 having a radius 64 is constructed. Using point 62 as the apex of a cone, a conical surface 65 with an apex angle 66 is constructed connecting the spherical surface 63 to a flange 67. The conical surface 65 acts as a stop surface as later described. The flange 67 is undercut to form surface 68, providing clearance for driveshaft surface 40. (FIG. 6). The periphery 69 of flange 67 is shown smooth and is intended for a shrink fit with cap 32 at assembly.

Figure 13:
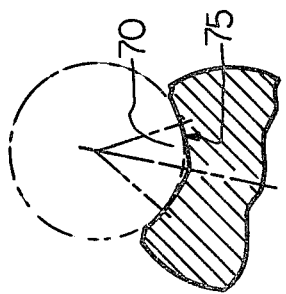
FIG. 13 is a sectional view taken in the direction of arrows 13—13 shown in FIG. 12.
Figure 12:
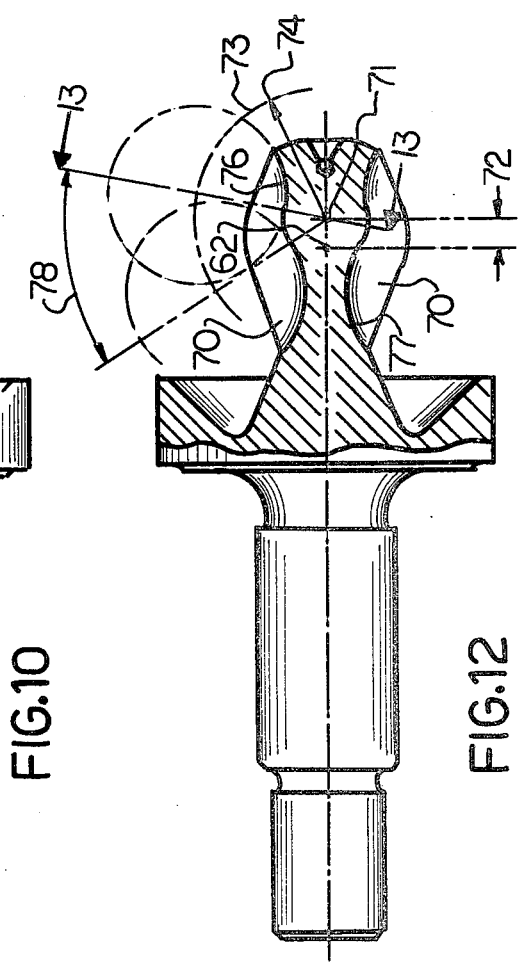
FIG. 12 is a sectional view taken in the direction of arrows 12—12 shown in FIG. 10.

Refer to FIG. 12 and FIG. 13. Two grooves 70, diametrically opposite, are cut into surface 63 (FIG. 10) in the following manner:

A point 71 is located to the right of point 62 at a distance 72. Using this point as a center, a circle 73 of radius 74 establishes a theoretical line path. A contoured cutter cuts a groove 70, such that the center of ball 33 rolling in contact with the groove will follow the path. The groove cross section shown in FIG. 13 is preferably in the form of a gothic arch 75 (shown exaggerated) or an ellipse rather than a circle, these curves providing better control of the ball to groove contact areas. The grooves are cut in an axial direction to stops 76 and 77 defined by angle 78. A chamfer 79 (FIG. 11) is provided around both grooves to remove sharp edges, resulting in a chordal distance 80.

Radius 74 (FIG. 12) equals driveshaft radius 53 (FIG. 8), and distance 72 equals driveshaft distance 51.

Cap 32:

Refer to FIG. 16. The cap 32 has a hole 81 with a central axis 82. The inside surface 83 of the hole is shown smooth. It is intended for a shrink fit with the wheel spindle flange at assembly.

Using a point 84 on the axis 82 of hole 81 as a center, a partial concave spherical surface 85 of radius 86 is constructed. A cylindrical surface 87 sharing axis 82 is constructed in the end of the cap opposite hole 81. The radius 88 of this cylindrical surface can equal radius 86 of the spherical surface 85 as shown in the lower half of FIG. 16, or it can be smaller as shown in the upper half of the figure, depending on the type of assembly used to join spindle and cap. For example, if the cap is heated to expand it for a shrink fit assembly, the radius 88 can be smaller than radius 86.

Refer to FIG. 14. Two grooves 89, diametrically opposite, are cut into surfaces 85 and 87 in the following manner:

On axis 82, a point 90 is located to the right of point 84 at a distance 91. Using this point as a center, a circle 92 of radius 93 establishes a theoretical line path. A contoured cutter cuts a groove 89 such that the center of ball 33 rolling in contact with the groove will follow the path. The groove cross section, as in the spindle 31, is in the form of a gothic arch 94 in FIG. 15 (shown exaggerated). The grooves are cut in an axial direction open at both ends of the cap, having no angular limit.

Radius 93 equals spindle radius 74 (FIG. 12), and distance 91 equals spindle distance 72.

Ball 33:

The ball 33 is a hardened ball of precise dimension, relatively large compared to prior art.

2. Method of Assembly.

Figure 19:
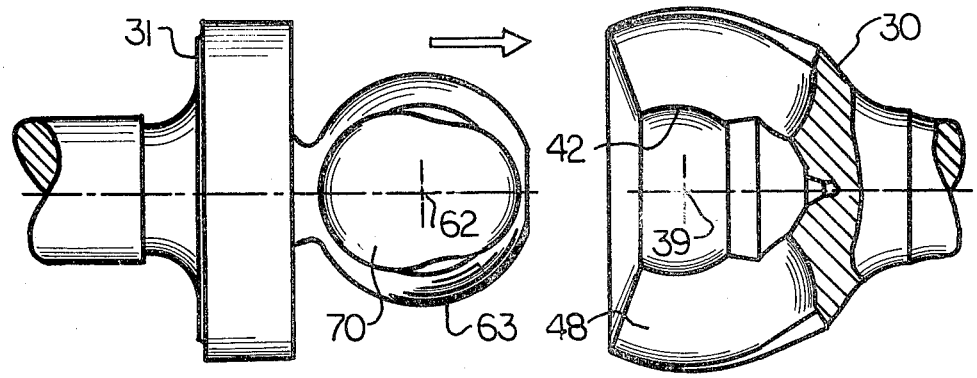
FIG. 19 is a view of the wheel spindle and the driveshaft in position for assembly.

Refer to FIG. 19. Wheel spindle 31 is aligned with driveshaft 30, with spindle grooves 70 aligned with driveshaft slots 48. The spindle is then inserted into the driveshaft until center point 62 aligns with center point 39, the width 80 (FIG. 11) being such as to allow entry into the driveshaft slots 48. The spindle is then turned 90° to engage convex spherical surface 63 with concave spherical surface 42.

Figure 20:
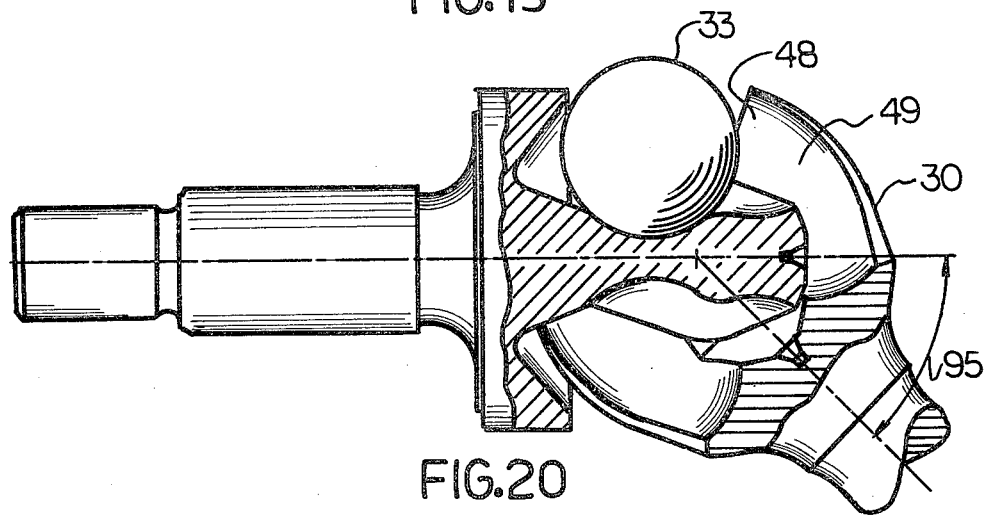
FIG. 20 is a view of the wheel spindle and the driveshaft in assembled position for receiving a drive ball.

Refer to FIG. 20. Driveshaft 30 is then swung to maximum angularity 95, and a ball 33 is inserted into a slot 48 to engage grooves 49. A second ball is inserted in the same manner, and the shafts are swung back into alignment.

Figure 21:
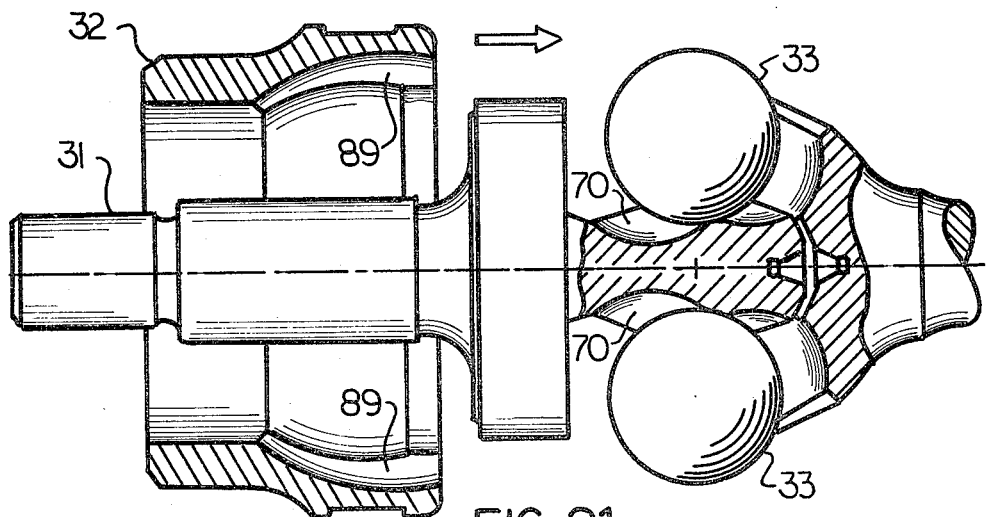
FIG. 21 is a view of the assembled wheel spindle, driveshaft, and balls with cap in position for assembly.

Refer to FIG. 21. Cap 32 is then placed over the spindle 31 as shown. Using an assembly fixture to keep grooves 89 in the cap aligned with grooves 70 on the spindle and also with balls 33, the cap is moved towards the driveshaft until cap spherical surface 85 (FIG. 16) contacts driveshaft spherical surface 40 (FIG. 7).

It then remains to lubricate the inside of the assembly and install the boot and clamps. The result is a unitary, jointed driveshaft assembly as shown in FIG. 1.

3. Mode of Operation.

Figure 4:
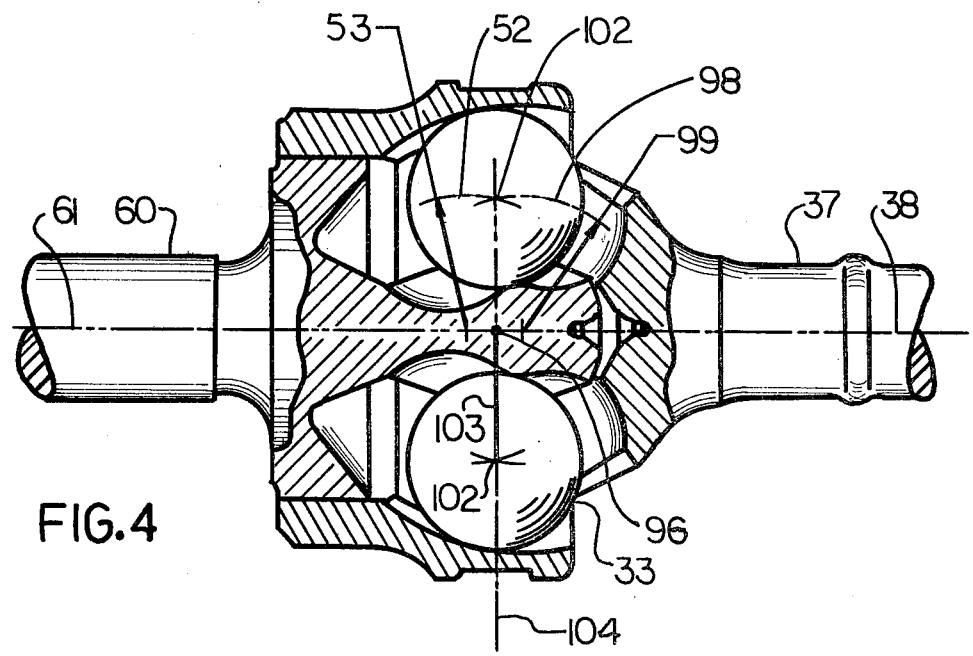
FIG. 4 is a sectional view taken in the direction of arrows 4—4 shown in FIG. 1 with boot removed.

Refer to FIG. 1 and FIG. 4. In the assembled joint, the shaft portion 60 of the second joint half and the shaft portion 37 of the first joint half can assume any position of angularity to each other, up to a maximum, about point 96, which is the center of the double ball and socket.

Figure 5:
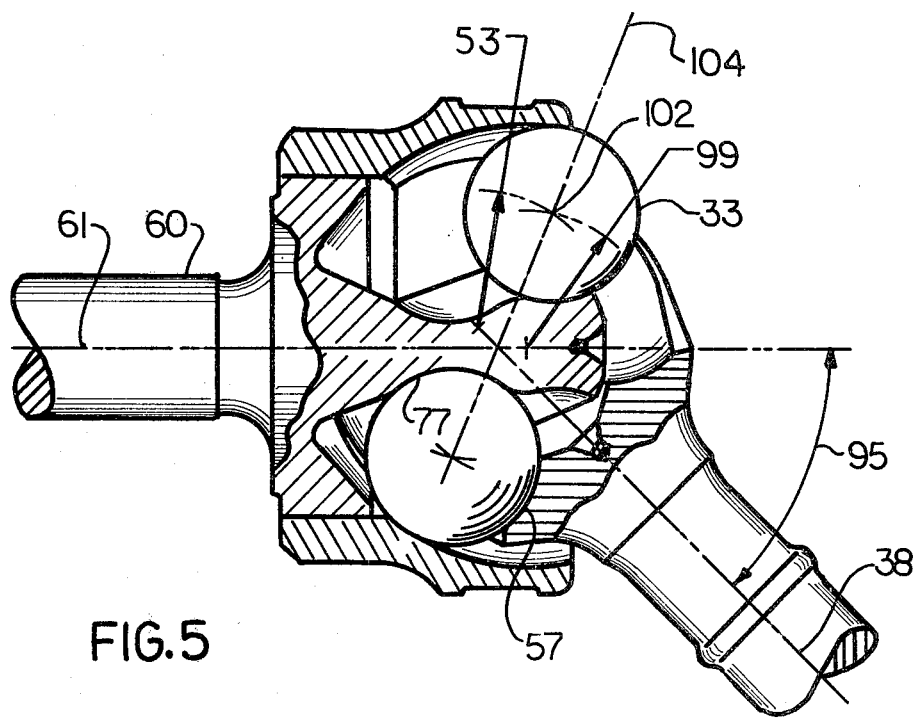
FIG. 5 is a sectional view identical to FIG. 4 but with shafts shown at maximum angularity.

Maximum angularity is limited by two stops. One stop (FIG. 3) is provided by contact between conical face 46 on the driveshaft and and conical surface 65 on the wheel spindle. The other stop (FIG. 5) is provided by pockets 57 on the driveshaft and pockets 77 on the wheel spindle acting against the ball 33. Two stops are necessary for a two ball design because the stop provided by the conical surfaces becomes inoperable when the two balls move into the plane defined by the inclined axes of rotation.

Because of the ball and socket connection, the two joint halves are restrained axially and can absorb thrust from either axial direction.

Figure 2:
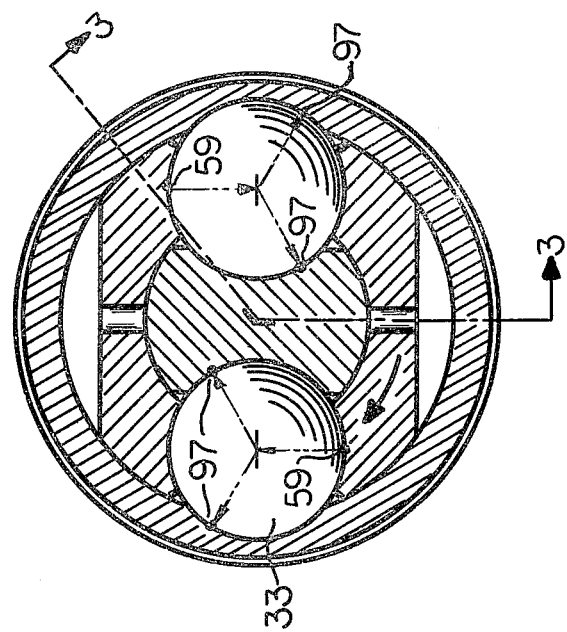
FIG. 2 is a sectional view taken in the direction of arrows 2—2 shown in FIG. 1.
Figure 3:
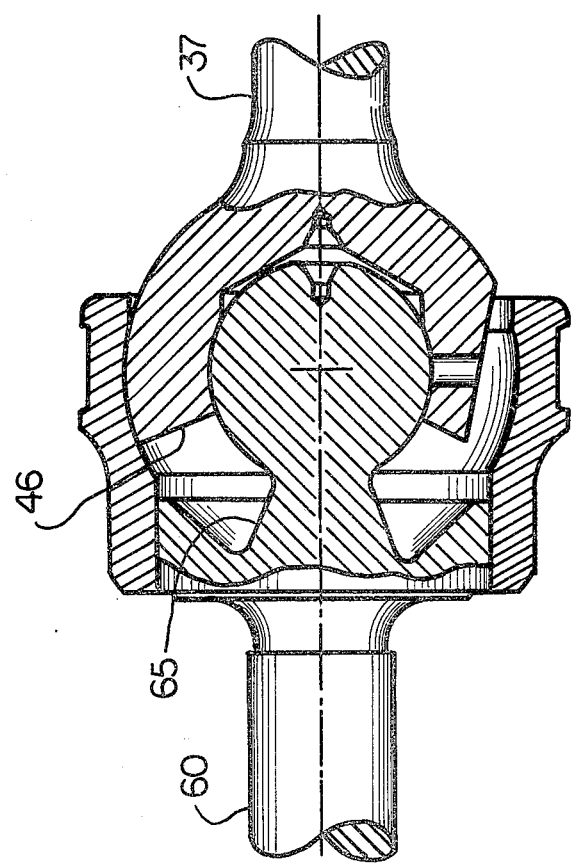
FIG. 3 is a sectional view taken in the direction of arrows 3—3 shown in FIG. 2.

Refer to FIG. 2 and FIG. 3. Torque is transmitted from the shaft portion 37 of the first joint half to the shaft portion 60 of the second joint half by balls 33, the torque being transferred from contact point 59 (FIG. 2) on the first joint half to contact points 97 on the second joint half when the direction of rotation is as shown. It is obvious that torque can be transferred through the balls in the opposite direction of rotation, the contact points reversing their positions. FIG. 2 clearly shows the interposed relationship of the two sets of circumferentially opposed grooves with the two sets of radially opposed grooves.

In the first joint half (FIG. 8), the ball 33 is positively confined by the set of grooves 49 to describe circle 52 of radius 53 with center 50 displaced a distance 51 from the center of the ball and socket. This fixed spatial relation of circle 52 to the center of the ball and socket that exists in the first joint half has its exact counterpart in the second point half. This is best visualized by referring to FIG. 17, which shows wheel spindle 31 joined with cap 32 to form an integral part with two sets of radially opposed grooves.

In this FIG. 17, circle 98, radius 99, center 100, and distance 101 are the results of the superimposition of circles 73 and 92, radii 74 and 93, centers 71 and 90, and distances 72 and 91 when wheel spindle 31 was assembled with cap 32. Thus circle 98, radius 99, and distance 101 are equal to their like in the first joint half and bear the same spatial relationship to the center of the ball and socket.

Put in other words, the spatial relation of the ball line path in the first joint half to the center of the ball and socket, is identical to the spatial relation of the ball line path in the second joint half to the center of the ball and socket. Also, the geometrical shape of the ball line path in the first joint half is identical to the geometrical shape of the ball line path in the second joint half.

Refer to FIG. 4. The two joint halves are facing each other and have the common ball and socket center 96. The two line paths 52 and 98 are mirror images of each other about center 96 and will always intersect at a point 102.

By geometry, a line 103 drawn from this point 102 to point 96 will always bisect the angle of inclination of the axes, whether that angle be zero or a maximum. Furthermore, as the joint rotates and the point of intersection 102 moves out of the plane containing both axes of rotation 38 and 61, when inclined to each other, line 103 will generate the homokinetic plane 104.

Since a ball 33 must occupy both line paths simultaneously, it can only do so at the intersection point 102. Thus the balls always are located in the homokinetic plane and the torque is transmitted with constant velocity.

4. Comments.

The following are additional facts that contribute to a fuller understanding of the invention:

(a) A two ball design is described. Subject to practical considerations, any odd or even number of balls can be used. A one ball design is workable but impractical. It does emphasize a basic difference between the prior art crossed dependent groove principle which dictates a minimum of four balls and the new crossed independent groove principle which permits any number.

(b) A solid ball is specified. A hollow ball is feasible and may result in better conformity with the groove profile and a lower level of hertz stress. Also weight and centrifugal force would be reduced.

(c) For good ball control, the ball path radius should not be more than five times the displacement distance.

(d) A shrink fit between flange circumference and cap inside surface is specified. It is obvious that other mechanical connections are feasible, such as press fit serrations, welding, et cetera, as long as they can resist torsional and axial stress.

(e) The grooves on the wheel spindle and inside the cap are described as being cut into the surface. However, because of the two piece construction, the grooves could be formed by a chipless method such as coining or cold forming.

The foregoing description has been very specific to best exemplify one preferred embodiment. Variations are possible, and some have been noted.

Accordingly, the scope of this invention should not be determined by the embodiment, but by the appended claims and their legal equivalents.

What is claimed is:

1. A homokinetic joint comprising:
a first joint half, having a first axis of rotation;
a second joint half, having a second axis of rotation;
means to axially restrain the first joint half and the second joint half while allowing angular movement about a point in the first axis of rotation and in the second axis of rotation;
a first set of two axially extending circumferentially opposed grooves formed in the first joint half;

a second set of two axially extending radially opposed grooves formed in the second joint half; and an intermediate member positioned in the first set of circumferentially opposed grooves and in the second set of radially opposed grooves, occupying both sets simultaneously, to make a torque transmitting connection between said first joint half and said second joint half;

the grooves of said first and second sets are each arranged in conjugate pairs so as to constrain said intermediate member independently of the other of said first and second sets.

2. A homokinetic joint comprising:

a first joint half, having a first axis of rotation and a first spherical means;

a second joint half, having a second axis of rotation and a second spherical means;

the first spherical means nesting in the second spherical means to axially restrain the first joint half and the second joint half which allowing angular movement about a point in the first axis of rotation and in the second axis of rotation;

a first set of two axially extending circumferentially opposed grooves formed in said first spherical means;

a second set of two axially extending radially opposed grooves formed in said second spherical means; and an intermediate member positioned in the first set of circumferentially opposed grooves and in the second set of radially opposed grooves, occupying both sets simultaneously, to make a torque transmitting connection between said first joint half and said second joint half;

the grooves of said first and second sets are each arranged in conjugate pairs so as to constrain said intermediate member independently of the other of said first and second sets.

3. A homokinetic universal joint comprising:

a first joint half, having a first axis of rotation, a convex spherical surface, and a concave spherical surface spaced inwardly from the convex spherical surface and concentric therewith, to define an annular spherical wall with a center on the first axis of rotation, and a first set of two axially extending circumferentially opposed grooves formed in the spherical wall;

a second joint half, having a second axis of rotation, a concave spherical surface, and a convex spherical surface spaced inwardly from the concave spherical surface and concentric therewith, to define an annular spherical cavity with a center on the second axis of rotation, an axially extending first groove formed in the concave spherical surface, an axially extending second groove formed in the convex spherical surface, the first groove being in opposed radial relation to the second groove, to define a second set of two axially extending radially opposed grooves;

said annular spherical wall nesting in the annular spherical cavity for angular movement about a common point in the first and second axes of rotation; and a ball positioned in the first set of circumferentially opposed grooves and in the second set of radially opposed grooves, occupying both sets simultaneously to make a torque transmitting connection between the first joint half and the second joint half;

the grooves of said first and second sets are each arranged in conjugate pairs so as to constrain said ball independently of the other of said first and second sets.

4. A homokinetic universal joint comprising:

a first joint half, having a first axis of rotation, a convex spherical surface, and a concave spherical surface spaced inwardly from the convex spherical surface and concentric therewith, to define an annular spherical wall with a center on the first axis of rotation, and a first set of two axially extending circumferentially opposed grooves formed in the spherical wall;

a second joint half, having a spindle defining a second axis of rotation, and having a convex spherical surface with its center on the second axis of rotation, an axially extending first groove formed in the convex spherical surface, and a flange with a periphery concentric with the second axis of rotation;

a cap, having a concave spherical surface, a hole adjacent to and concentric with the concave spherical surface, an axially extending second groove formed in said concave spherical surface;

the spindle and the cap in assembled position defining an annular spherical cavity with its center on the second axis of rotation, and further defining a second set of two axially extending radially opposed grooves;

the said flange periphery and the said hole in the cap forming an axially and torsionally fixed interface;

said annular spherical wall nesting in the annular spherical cavity for angular movement about a common point in the first and second axes of rotation; and a ball positioned in the first set of circumferentially opposed grooves and in the second set of radially opposed grooves, occupying both sets simultaneously to make a torque transmitting connection between the first joint half and the second joint half;

the grooves of said first and second sets are each arranged in conjugate pairs so as to constrain said ball independently of the other of said first and second sets.

5. The homokinetic joint of claim 3 or 4 in which:

said first set of two axially extending circumferentially opposed grooves defines a first ball center line path, the path being in a first spatial relation to said center of the annular spherical wall;

said second set of two axially extending radially opposed grooves defines a second ball center line path, said second path being in a second spatial relation to said center of the annular spherical cavity;

the geometrical shape of the first ball center line path being identical to the geometrical shape of the second ball center line path;

the first spatial relation being identical to the second spatial relation;

the first ball center line path intersecting the second ball center line path at a point, each path forming a mirror image of the other in the assembled condition of said first joint half and said second joint half.

6. The homokinetic joint of claim 5 in which:

said first ball center line path is a first circular arc, with a first radius originating from a first center that is displaced a first axial distance in a first direction from the center of said annular spherical wall, the first circular arc and the first center lying in a radial plane that contains said first axis of rotation;

said second ball center line path is a second circular arc, with a second radius originating from a second center that is displaced a second axial distance in a second direction from the center of said annular spherical cavity, the second circular arc and the second center lying in a radial plane that contains said second axis of rotation;

said first radius is equal to said second radius, said first axial distance is equal to said second axial distance, said first direction being opposite to said second direction in the assembled condition of the first joint half and the second joint half.

7. The homokinetic joint of claim 6 in which:
said first center of the first circular arc lies on said first axis of rotation;
said second center of the second circular arc lies on said second axis of rotation.

8. The homokinetic joint of claim 3 or 4 in which:
said first set of two axially extending circumferentially opposed grooves is one of a first plurality of first sets;
said second set of two axially extending radially opposed grooves is one of a second plurality of second sets;
the first plurality being equal in number to the second plurality;
the circumferential spacing of the first plurality matching the circumferential spacing of the second plurality in the assembled condition of said first joint half and said second joint half;
said ball is one of a plurality of balls equal in number to said first plurality of first sets, a ball being positioned in each first set of circumferentially opposed grooves and in each second set of radially opposed grooves, occupying both sets simultaneously.

9. A homokinetic universal joint comprising:
a driveshaft defining a first axis of rotation, and having a truncated ball-like end comprising a convex spherical surface, a concave spherical surface spaced inwardly from the convex spherical surface and concentric therewith to define an annular spherical wall with a center on the first axis of rotation, the wall having a concave conical end surface with its apex lying on the center of the annular spherical wall, two axially extending grooves cut into the spherical wall to a measured axial depth from the conical end surface forming a first groove end surface, and defining a first set of two axially extending circumferentially opposed grooves, a second like set of two axially extending circumferentially opposed grooves positioned diametrically opposite to the first set; a spindle defining a second axis of rotation, and having a ball-like end with a convex spherical surface with its center lying on the second axis of rotation, a flange with a periphery concentric with the second axis of rotation and connected to the ball-like end by a convex conical surface with its apex lying on the center of the convex spherical surface, a first axially extending groove cut into the convex spherical surface a measured axial length forming a second groove end surface adjacent to the flange and a third groove end surface remote from the flange, a like second axially extending groove positioned diametrically opposite to the first groove;

a cap, having a concave spherical surface, a hole adjacent to and concentric with the concave spherical surface, a first axially extending groove cut into said concave spherical surface, a like second axially extending groove positioned diametrically opposite to the first groove;

the spindle and the cap in assembled position defining an annular spherical cavity with its center on the second axis of rotation, and further defining a first set of two axially extending radially opposed grooves, and a second set of two axially extending radially opposed grooves diametrically opposite to the first set;

the said flange periphery and the said hole in the cap forming an axially and torsionally fixed interface;

said driveshaft annular spherical wall nesting in said annular spherical cavity for angular movement about a common point in the first and second axes of rotation, while axially restraining said driveshaft and spindle;

a first ball positioned in said first set of circumferentially opposed grooves, the ball being simultaneously positioned in said first set of radially opposed grooves;

a second ball positioned in said second set of circumferentially opposed grooves, the ball being simultaneously positioned in said second set of radially opposed grooves, said first and second balls making a torque transmitting connection between the driveshaft and spindle; said balls confined to limited angular travel by said spindle second and third end surfaces.

10. The homokinetic universal joint of claim 9 in which:
said first set and said second set of axially extending circumferentially opposed grooves each define a ball center line path, said path being a first circular arc with a first radius originating from a first center lying on said first axis of rotation, the center being displaced a first axial distance in a first direction from the center of said annular spherical wall, the first circular arc lying in a radial plane containing said first axis of rotation;
said first set and said second set of axially extending radially opposed grooves each define a ball center line path, said path being a second circular arc with a second radius originating from a second center lying on said second axis of rotation, the center being displaced a second axial distance in a second direction from the center of said annular spherical cavity, the second circular arc lying in a radial plane containing said second axis of rotation;
said first radius is equal to said second radius, said first axial distance is equal to said second axial distance, said first direction being opposite to said second direction in the assembled condition of the joint.

11. The homokinetic universal joint of claim 9 in which:
said concave conical end surface of the driveshaft and said convex conical surface of the spindle define a first stop means;
said first groove end surface of the driveshaft and said second groove end surface of the spindle contacting said ball define a second stop means;
said first stop means cooperating with said second stop means to prevent further angular movement between driveshaft and spindle at maximum joint angularity in all positions of driveshaft rotation.

* * * * *